US010274514B2

(12) United States Patent
De Lourenço E Vasconcelos et al.

(10) Patent No.: US 10,274,514 B2
(45) Date of Patent: Apr. 30, 2019

(54) METALLIC DEVICE FOR SCANNING NEAR-FIELD OPTICAL MICROSCOPY AND SPECTROSCOPY AND METHOD FOR MANUFACTURING SAME

(71) Applicants: Universidade Federal de Minas Gerais—UFMG, Belo Horizonte (BR); INSTITUTO NACIONAL DE METROLOGIA, QUALIDADE E TECHNOLOGIA—INMETRO, Rio de Janeiro (BR)

(72) Inventors: Thiago De Lourenço E Vasconcelos, Belo Horizonte (BR); Bráulio Soares Archanjo, Belo Horizonte (BR); Luiz Gustavo De Oliveira Lopes Cançado, Belo Horizonte (BR); Carlos Alberto Achete, Belo Horizonte (BR); Wagner Nunes Rodrigues, Belo Horizonte (BR); Ado Jorio De Vasconcelos, Belo Horizonte (BR); Benjamin Fragneaud, Belo Horizonte (BR); Douglas Dos Santos Ribeiro, Belo Horizonte (BR); Cassiano Rabelo E Silva, Belo Horizonte (BR); Bruno Santos De Oliveira, Belo Horizonte (BR)

(73) Assignees: UNIVERSIDADE FEDERAL DE MINAS GERAIS—UFMG, Belo Horizonte (BR); INSTITUTO NACIONAL DE METROLOGIA QUALIDADE E TECNOLOGIA—INMETRO, Rio de Janeiro (BR)

( * ) Notice: Subject to any disclaimer, the term of this patent is extended or adjusted under 35 U.S.C. 154(b) by 0 days.

(21) Appl. No.: 15/572,355

(22) PCT Filed: May 6, 2016

(86) PCT No.: PCT/IB2016/052610
§ 371 (c)(1),
(2) Date: Nov. 7, 2017

(87) PCT Pub. No.: WO2016/178193
PCT Pub. Date: Nov. 10, 2016

(65) Prior Publication Data
US 2018/0120345 A1    May 3, 2018

(30) Foreign Application Priority Data
May 7, 2015 (BR) .......................... 102015010352

(51) Int. Cl.
*G01Q 70/10* (2010.01)
*G01Q 60/22* (2010.01)

(52) U.S. Cl.
CPC .......... *G01Q 70/10* (2013.01); *G01Q 60/22* (2013.01)

(58) Field of Classification Search
USPC ........................................... 850/32
See application file for complete search history.

(56) References Cited

U.S. PATENT DOCUMENTS

| 4,604,520 A | 8/1986 | Pohl |
| 4,917,462 A | 4/1990 | Lewis et al. |

(Continued)

FOREIGN PATENT DOCUMENTS

| BR | 10 2012 026973 | 8/2014 |
| BR | 10 2012 033304 | 8/2014 |

(Continued)

OTHER PUBLICATIONS

International Search Report for PCT/IB2016/052610, dated Sep. 16, 2016, seven pages.

(Continued)

*Primary Examiner* — Phillip A Johnston
(74) *Attorney, Agent, or Firm* — Hayes Soloway P.C.

(57) ABSTRACT

The present invention relates to a metallic device for near-field optical microscopy and spectroscopy, as well as to a (Continued)

method of preparing it. Said device comprises a single body (1) with longitudinal prolongation (2), nanometric apex (4) and has at least one trimming (3) on its surface, being applied as a probe of high optical efficiency, with adequate dimensions and details that enable the best photon-plasmon coupling, enabling the analysis, with high space resolution, of structures of nanometric dimensions with high efficiency and reproducibility.

16 Claims, 3 Drawing Sheets

(56) References Cited

U.S. PATENT DOCUMENTS

| | | | | |
|---|---|---|---|---|
| 5,442,298 | A * | 8/1995 | Chang | G01N 27/043 324/713 |
| 5,789,742 | A | 8/1998 | Wolff | |
| 6,545,276 | B1 * | 4/2003 | Sasaki | G01Q 60/22 250/216 |
| 6,864,481 | B2 * | 3/2005 | Kaito | B82Y 15/00 250/306 |
| 7,182,672 | B2 * | 2/2007 | Tunaboylu | B24B 19/16 451/36 |
| 7,572,300 | B2 | 8/2009 | Cohen et al. | |
| 7,847,207 | B1 * | 12/2010 | Chow | C01B 32/15 219/68 |
| 8,196,217 | B2 | 6/2012 | Cheng et al. | |
| 9,533,376 | B2 * | 1/2017 | Veeramani | B23K 26/18 |
| 2005/0083826 | A1 | 4/2005 | Anatoliy et al. | |
| 2010/0032719 | A1 | 2/2010 | Hong et al. | |

FOREIGN PATENT DOCUMENTS

| | | |
|---|---|---|
| CN | 103176283 | 6/2013 |
| WO | 2009/085184 | 7/2009 |

OTHER PUBLICATIONS

Written Opinion of the ISA for PCT/IB2016/052610, dated Sep. 16, 2016, ten pages.

Ropers et al. "Grating-Coupling of Surface Plasmons onto Metallic Tips: A Nanoconfined Light Source" Nano Letters, 2007, vol. 7, No. 9, pp. 2784-2788.

* cited by examiner

METALLIC DEVICE FOR SCANNING NEAR-FIELD OPTICAL MICROSCOPY AND SPECTROSCOPY AND METHOD FOR MANUFACTURING SAME

This application is the U.S. national phase of International Application No. PCT/IB2016/052610, filed 6 May 2016, which designated the U.S. and claims priority to BR 102015010352-2, filed 7 May 2015; the entire contents of each of which are hereby incorporated by reference.

FIELD OF THE INVENTION

The present invention relates to a metallic device and a method for manufacturing it, for applications in near-field microscopy and spectroscopy. More precisely, one describes a metallic device for application as a high-efficiency optical probe.

BACKGROUND OF THE INVENTION

Conventional optical microscopes exhibit a limited space resolution of approximately $\lambda/2$, that is, about 300 nm in the case of visible light as a source ($\lambda$ being the wavelength of the incident light). This limit is given by the Rayleigh criterion, which is defined as the separation between two punctual sources of light, so that the main maximum of diffraction of one will coincide with the first minimum of diffraction of the other.

However, a space resolution higher than this limit may be achieved within the near-field regime. One of the ways to carry out this type of experiment is by using a nanometric probe to collect part of the near-field regime information and transmitting it to the far-field regime. In this way, the probe acts as an optical nanoantenna. In a simplified view, a nanometric optical collector/source scans the sample, generating an image with resolution defined by the size of the source/collector.

The recently worked out Scanning Near-field Optical Microscopy, called also SNOM, is a technique that uses this mechanism to generate images, chemical and structural characterization on the nanometric scale. As a more specific example of this system, the Tip-Enhanced Raman Spectroscopy (TERS), (Chem. Phys. Ltt. 335, 369-374 (2001)) uses the Raman spread in near-field regime to create images of high space resolution.

In spite of its great application potential, the SNOM technique is not yet applied at laboratories due to the difficulty in manufacturing tips with high reproducibility, good optical efficiency, mechanical stability and nanometric apex, which parameters are indispensable to its application as probes in the SNOM system.

Thus, different types of probes have been proposed in the last three decades.

Historically, the first probes were built with optical fibers with tapered end, provided with end opening of tens of nanometers. Other similar probes comprise transparent dielectric tips with metallic covering. The system that uses this type of probe is called aperture-SNOM, pointing out the fact that these probes exhibit an aperture at their apex, through which light is transmitted.

However, these probes have a great disadvantage: the power transmitted by the optical fiber decreases exponentially with their diameter. For this reason, these aperture-SNOM systems exhibit space resolution on the order of from 50 to 100 nm and are still limited by applications where the analyzed signal is very intense, as for example, photoluminescence.

The best resolutions and optical efficiencies achieved were obtained by using apertureless metallic probes, more specifically from noble metals (Hartschuh et al, Phys. Rev. Lett. 90, 2003). On these devices, the physical mechanism that leads to the use of the near-field information differs from the governing mechanism on the probe for aperture-SNOM. Basically, the incident light (source of light or signal of the sample) causes the free electrons of the metallic probe to oscillate collectively and coherently in the interface with the medium. This sharp-pointed electronic oscillation is called surface plasmon. Due to the conical, pyramidal or sharp-tip shape of the probe, the excitation of the surface plasmon in it generates a strong optical effect located at the apex of the probe, due to the high variation in the electronic density at this point. Thus, unlike optical fiber, the smaller the apex of the metallic probe the greater the optical efficiency and the better the space resolution achieved.

The system that uses this type of probe is called scattering-type SNOM (s-SNOM or apertureless SNOM).

Based on this premise, a number of techniques for manufacturing probes for apertureless-SNOM have been developed. The most widely used ones at present are those for electrochemical trimming of gold thread and deposition of silver onto Si tips, manufactured for the AFM technique (Atomic Force Microscopy).

In fact, it is noted that many of the articles published in the near-field optical microscopy area are related to the production and characterization of the scanning devices/probes (Lambelet P. et al, Applied Optics, 37 (31), 7289-72-92 (1998); Ren. B., Picardi G., Pettinger, B., Rev. Sci. Instrum. 75, 837 (2004); Bharadwaj, P., Deutsch B., Novotny, L., Adv., Opt. Photon. 1, 438-483 (2009)).

What aggravates the problem of quality of the probe for SNOM is that its optical efficiency is related to the coupling of the incident light to its surface plasmon. Basically, in the visible and near infrared range, a considerable difference between the wave vector of the incident light and of the surface plasmon inhibits the direct conversion thereof.

However, a way to promote the light/plasmon coupling in an efficient manner would be by using the so-called localized surface plasmon resonance (LSPR). This type of plasmon resonance takes on nanostructures of dimensions smaller than the wavelength of the incident light, thus being submicrometric structure for the visible and near infrared range. Its main characteristics are: (i) its resonance energy that depends strongly on its geometry, and may be scaled proportionally with some dimension of the object; (ii) the resonance may be excited by light directly and efficiently.

Among the various applications for the localized surface plasmon resonance (LSPR), the s-SNOM technique has called special attention due to its high potential for the optical characterization for nanometric scales.

A number of Prior-Art documents describe the use of multiple ways to improve the optical efficiency of metallic massive probes for use in SNOM, as verified in documents Ropers, C., et al., Nano letters. 7, 2784-2788 (2007), entitled: "*Grating-Coupling of Surface Plasmons onto Metallic Tips: A Nanoconfined Light Source*".

However, these documents deal with multiple and equidistant forms, positioned tens of micrometers from the nanometric apex, so that the incident light (laser) is focused on the structures, without illuminating the apex.

CN1031176283, entitled "Micro-Medium Cone and Nanometalgrating-Compound Adopticalprobe", describes multiple cracks and surfaces made on the outer metallic layer of conical probes made of a dielectric material for use in aperture-SNOM. However, this type of system needs internal dielectric and also an aperture in the apex.

Various patent applications focus specifically on the properties of the SNOM probes, approaching its functioning and, in some cases, its manufacture. This can be verified in the documents cited hereinafter.

U.S. Pat. No. 4,917,462, entitled "Near field scanning optical microscopy", which describes a probe with aperture in the form of a glass pipette coated with tapered metal that has a tip that enables near-field access of a probe for near-field microscopy. The pipette is formed from a glass tube stretched downwardly into a sharp tip and then coated by evaporation with a metallic layer. The central aperture of the tube is dragged down to a submicrometer diameter, and the metal coating is formed with an aperture at the apex. It also discloses a microscope using the aperture pipette for near-field digitalizing of sample images.

US 2005/0083826, entitled "Optical fiber probe using an electrical potential difference and an optical recorder using the same". It describes an optical fiber probe that generates an electric potential difference formed between the thin metal layers coated with it, to increase the light transmission rate. The optical fiber probe includes a near-field probe, with a core transmitting incident light from an external light source and having circular cone structure formed at a core end, and is coated on a surface of the circular cone structure to protect the core. The optical fiber probe also includes the metal-coated thin layers on the near-field probe, arranged symmetrically on opposite sides of the near-field probe, and spaced apart from the other to generate the difference in electric potential.

U.S. Pat. No. 4,604,520, entitled "Optical near-field scanning microscopy". It approaches a near-field optical microscope comprising a "lens" (aperture) fitted with conventional vertical adjustment apparatus and that consists of an optically transparent crystal, having a metal coating with an aperture at its tip with a wavelength diameter of the light used to illuminate the object. Connected to the farthermost end of the "lens" aperture is a photodetector through an optical filter and an optical glass fiber cable. The digitalization of the object is made by moving adequately the support along the coordinates x and y. the resolution obtained with this microscope is about 10 times as high as that obtained on prior-art microscopes.

US 2010/0032719, entitled "Probes for scanning probe microscopy". It embraces probes for scanning microscopy comprising a semiconductive hetero structure and the methods of making the probes. The semiconductive hetero structure determines the optical properties of the probe and enables optical image with nanometric resolution.

WO 2009/085184, entitled "Protected metallic tip or metallized scanning probe microscopy tip for optical applications". It relates generically to a probe for microscopic scanning with a protected metallic tip for applications in near-field optical scanning microscopy with closed tip that comprises a metallic tip or a metallic structure that covers a tip of the microscopic scanning probe, protected by an ultrafine dielectric layer. The protection layer is constituted by SiOx, Al2O3, or any other hard and ultrafine dielectric layer that prolongs the useful light of the tip, providing thermal, mechanical and chemical protection for the whole structure.

However, these probes from the prior art do not have reproducibility of optical efficiency. Some authors report that, even by selecting morphologically adequate gold tips, only 20% proved to be optically active, that is, could be used as probes in SNOM (Hartschu et al, J. of Microscopy, 210, 234-240 (2003)).

Thus, the present invention proposes a solution to the problems of the prior-art probes by providing a probe such as a metallic device that exhibits at least one trimming close to its apex.

The matter dealt with herein comprises a metallic device for use preferably as a near-field optical microscopy and spectroscopy. The proposed device comprises, in general, a single body that has, at its surface, at least one trimming with adequate dimensions and details, which enable the best coupling with the electric field of the polarized light, preferably in the direction normal to the surface to be analyzed. With adjustment of the trimming position with respect to the probe apex, the device enables one to tune the absorption to the frequency of the light used in the system of the desired application, by obtaining proper conditions to generate localized surface plasmon resonance (LSPR) with specific energy, leading to the improvement of the optical efficiency. The object proposed herein has reproducibility with regard to the efficacy in optical absorption and scattering at its apex, and can analyze structures of nanometric dimensions with high resolution.

BRIEF DESCRIPTION OF THE DRAWINGS

The attached figures are included in order to provide better understanding of the matter and are incorporated herein because they constitute a part of this specification, as well and illustrate embodiments of the present specification, and in conjunction with it, serve to explain the principles of the present invention.

DETAILED DESCRIPTION OF EMBODIMENTS OF THE INVENTION

Figure 1:
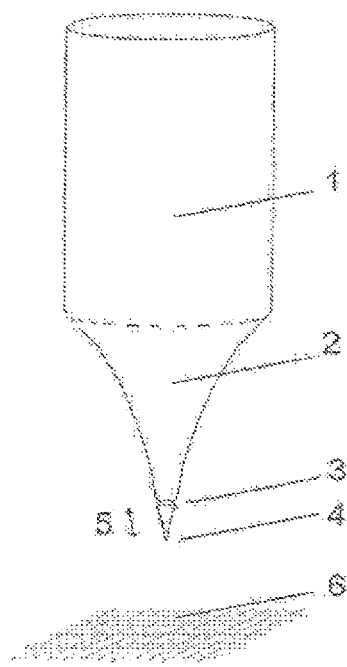
FIG. 1 is a schematic illustration of the device of the present invention close to a surface to be analyzed.
Figure 2:
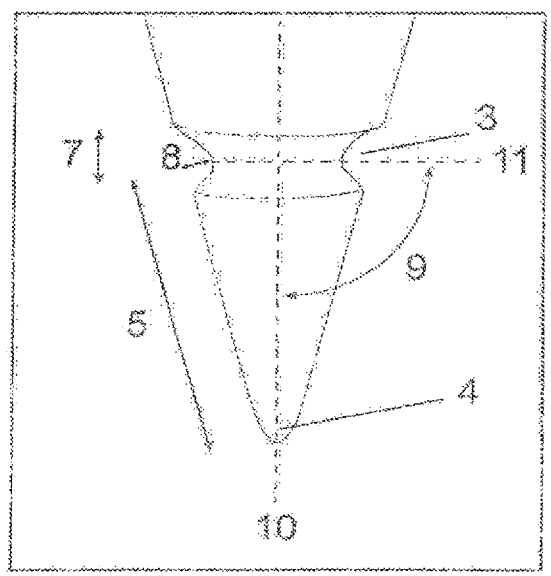
FIG. 2 is a schematic illustration of an enlarged partial view of the device of the present invention.

The present invention relates to a metallic device, such as illustrated in FIG. 1 and with details in FIG. 2, which is used preferably as a probe for near-field optical microscopy and spectroscopy, apertureless SNOM or TERS.

Thus, an objective of the present invention is to provide a device to be used as a probe for near-field optical microscopy and spectroscopy, said device being superior to those that are already known, since it guarantees high optical efficiency and an analysis with high space resolution of the structures of nanometric dimensions with efficiency and reproducibility.

Another objective of the present invention is to provide a method for preparing said device.

The proposed device has dimensions suitable for coupling to the electric light field with polarization preferably in the direction normal to the surface to be analyzed. An important aspect is the position of the trimming referring with respect to the apex of the device, which defines the optimum frequency of optical absorption. Upon adjusting this parameter so as to combine the absorption with the frequency of the incident light, the optical efficiency of the probe is optimized. Therefore, the making of this trimming in a position determined by the application (light used) is a fundamental factor of this invention.

More precisely, the metallic device comprises a single body (1) with longitudinal prolongation (2) and a nanometric apex (4). The single body has a central axis (10). Said apex (4) has a closed-tip shape. The cross-section of the longitudinal prolongation (2) decreases toward the apex (4).

The longitudinal prolongation (2) of the device of the present invention has, on its surface, at least one trimming (3).

In an embodiment, the longitudinal prolongation (2) has a trimming (3) on the surface of the device.

Advantageously, the distance (5) between the trimming (3) and the apex (4) defines the energy of maximum optical absorption, which can be adjusted to different applications within the visible and closed infrared range. This determines the importance of proposing the device claimed herein with at least one trimming (3), more preferably a trimming (3) localized close to the nanometric apex (4) for near-field optical microscopy and spectroscopy. In this way, the inventors have developed a device on which the distance (5) between the trimming (3) and the apex (4) is defined between 50 nm and 2 μm, preferably from 100 nm to 700 nm.

Trimming is defined as being the withdrawal of material from the surface, preferably in a fine and shallow manner, from the tip material. The trimming (3) is carried out on the surface of the material, according to orientation axis (11) that forms an angle (9) with the central axis (10) of the longitudinal prolongation (2). The angle (9) may range from 45 degrees to 135 degrees, preferably 90 degrees.

The trimming (3) length ranges from 20% to 100% of the perimeter of the surface of the longitudinal prolongation (2) and is made in an intermittent or continuous manner, preferably perpendicular to the central axis (10), with depth (8) ranging from 1 to 300 nm, preferably from 10 nm to 100 nm and width (7) ranging from 1 nm to 500 nm, preferably 100 nm, more precisely 20 nm.

The device is coupled to a system for sensing the probe-surface interaction, preferably a tuning fork (12), which may move along the planes xz, xy, yz with respect to a surface (6).

Further, the metallic device is composed of gold, silver, copper, aluminum, platinum, as well as combinations thereof.

The invention further relates to a method of manufacturing the above-mentioned metallic device, based on the trimming of the surface of the longitudinal prolongation (2) with a focused ion-beam, the trimming (3) being made on the surface of the material, according to orientation axis (11), which forms an angle (9) with the central axis (10) of the longitudinal prolongation (2). The angle (9) may range from 45 degrees to 135 degrees, preferably 90 degrees.

The matter dealt with in the present invention, in turn, eliminates the deficiencies of the above-cited prior art, since it exhibits confinement of the surface electrons, due to the trimming (3) and its distance (5) from the apex (4), leading to an electric dipole with direction and dimension suitable for coupling to the electric field of the light, polarized preferably in the direction perpendicular to the surface. The position of the trimming with respect to the apex may further be adjusted so that the maximum of absorption matches the energy of the incident light used in the specific application, thus generating an LSPR condition.

In an embodiment, FIG. 1 approaches a device with a trimming close to its nanometric end, for use as a probe in near-field microscopy and spectroscopy. The device is preferably composed of gold (Au), silver (Ag) or copper (Cu), platinum (Pt), aluminum (Al) or combinations of these elements. Close to the apex, the device exhibits a straight trimming (3) perpendicular to the axis (10) of the device.

The proposed device exhibits high efficiency in the photon-plasmon coupling with maximum optical absorption adjusted by parameters of the device itself, being suitable for applications that use incident light within the near infrared or ultraviolet range.

Figure 3:
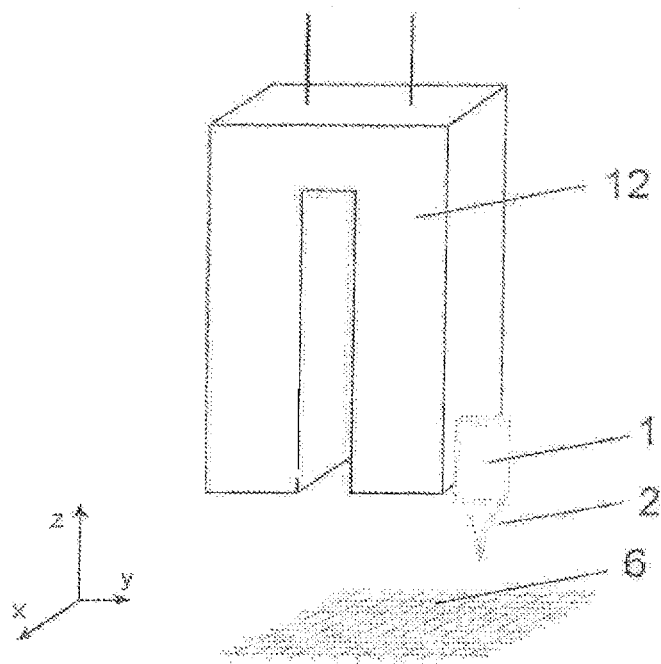
FIG. 3 is a schematic illustration of the device of the present invention, coupled to a system for sensing the probe-surface interaction, or a tuning fork.

FIG. 3 illustrates the device coupled to a system for sensing the probe-surface interaction, or a tuning fork.

Figures 4A, 4B:
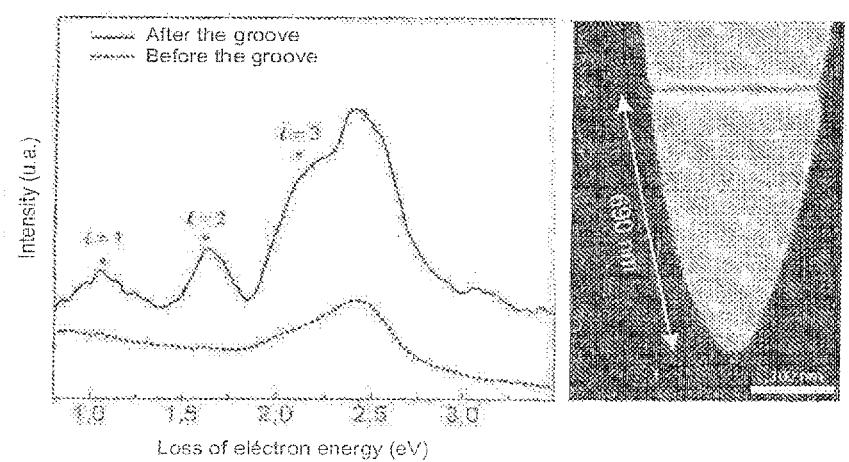
FIG. 4A is a graph exhibiting an analysis of electron energy loss spectroscopy (EELS) of the probe before making the trimming (dotted-line curve) and after making the trimming (solid-line curve).
FIG. 4B is an image of an embodiment of a device of the present invention, obtained by scanning electron microscope (SEM).

FIG. 4 presents an EELS analysis of a gold probe. The spectra were acquired close to the apex. FIG. 4A shows the spectra before (dotted-line curve) and after (solid-line curve) making the trimming at 690 nm distance from the apex. One observes the intensity of absorption close to the apex of the probe as a function of the excitation energy. FIG. 4B shows a SEM image of the probe after making the trimming.

The EELS technique can be used for analysis of absorptions interfering with the LSPR on nanostructures. The peaks of loss of energy at this spectrum may be related to optical absorptions provided by the LSPR (V. Myroshnychenko, et al, Nano Latters, 12, 4172-4180 (2012)). Before making the trimming, one only observes an absorption peak at about 2.5 eV. This peak is identified as the absorption referring to the surface plasmon resonance (SPR), observed on any gold object and that is not suitable for the proposed application. However, after making the trimming at 690 nm distance from the apex, one observes three new absorption peaks. These peaks were identified as the first three di-polar LSPR modes, generated from the illumination created by the trimming. An analysis of the maximum absorption energy as a function of the distance (5) between the trimming and the apex of a gold probe is shown in FIG. 5.

Figure 5:
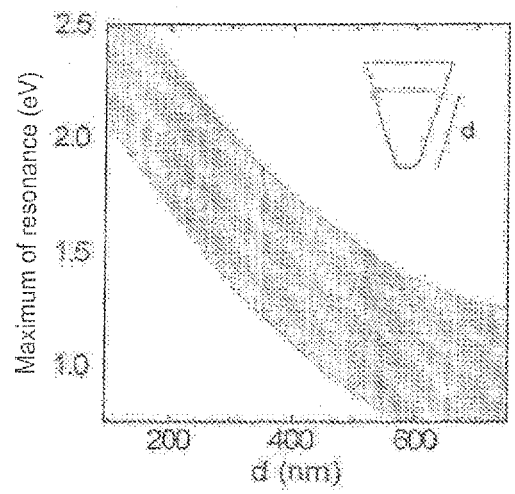
FIG. 5 is a graph exhibiting the relationship of maximum resonance energy as a function of the distance from the trimming to the probe apex.

FIG. 5 shows the relationship between the energy of maximum optical efficiency for gold probes as a function of the distance (5) between the trimming and the apex (in this graph called "d"). The demarcated area indicates the best range of distance (5) between the trimming and the apex to be considered.

Figure 6:
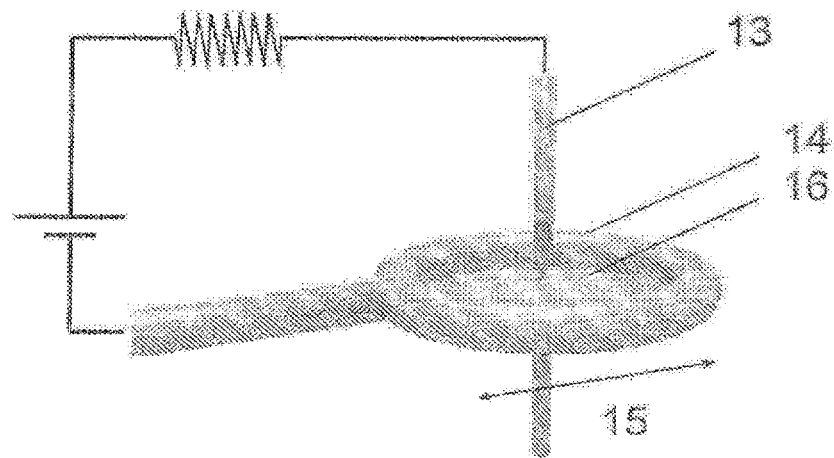
FIG. 6 is an illustration of a method of the present invention.

FIG. 6 illustrates the method of electrochemically trimming a gold thread (13). In this method, one applies a potential difference between the cathode (14) (a rim of diameter (15) made with a platinum or gold thread, preferably platinum) and the anode (13) (the gold thread to be trimmed). One also observes the electrolytic solution (16) that is presented as a thin membrane supported on the rim (14).

In the manufacture of the device, the trimming is made on a conventional probe that may be manufactured by the usual methods—Klein, M.; Schwitzgebel, G. Review of scientific instruments 1997, 68, 3099-31-03; B. A. F. Puygranier and P. Dawson, 85 235 (200); Johnson, t. W. et al. ACS Nano 6 (10), 9168-9174 (2012)). The manufacture of this probe is an initial part of the manufacture of the proposed device and should exhibit a few parameters suitable for the technique, such as: material and size of the apex (4). The trimming (3), in turn, may be manufactured by Focused ion Beam—FIB), respecting the parameters presented, such as: distance (5) from the apex (4), width (7) and depth (8). This technique imparts precision and reproducibility to the making of the trimming. The junction of the proposed device to the system for sensing the surface-probe interaction, preferably a piezo-electric oscillator (or tuning fork) (12), may be made both before and after making the trimming, preferably after trimming.

The metallic device with at least one trimming (3) and close to its nanometric apex (4) is superior to the presently available devices, since it provides means for evaluating the topography and the optical properties of a surface with efficiency and reproducibility.

The technical effects and advantages achieved with the device of the present invention are due to its peculiar structural presentation as a single body comprising at least one trimming, preferably a trimming with adequate dimensions and details. One points out the distance between the apex and the trimming which enables one to achieve better coupling to the electric field of the light with polarization preferably in the direction normal to the surface to be analyzed and the tuning of the absorption to the frequency of the light used in the system. Besides, the developed device is capable of guaranteeing reproducibility with regard to the efficacy in the absorption and optical scattering at its apex, and can analyze with high resolution structures of nanometric dimensions.

The matter dealt with can be better understood through the following non-limiting example.

EXAMPLE

In this example one describes a process for manufacturing the metallic device with single trimming close to the nanometric end, starting from a gold probe made by electrochemical trimming of gold thread.

The manufacture of the device in the manner treated in this example is divided into three steps: (i) manufacture of the gold tip by electrochemical trimming, (ii) marking the trimming by FIB and (iii) joining to the tuning fork.

The manufacture of the gold tip may be carried out by the usual electrochemical method of trimming a gold thread, as treated in the reference: Klein, M.; Schwitzgebel, G. Review of scientific instruments 1997, 68, 3099-3103, and B. A. F. Puygranier and P. Dawson, 85 235 (2000). The gold thread should have thickness between 15 µm and 300 µm, preferably 100 µm, and exhibit purity higher than 99%, preferably higher than 99.995%. At a first moment, the thread should undergo a thermal treatment without the need to use controlled atmosphere (either inert or reducing). The temperature ramp should follow the following values: heating up to a rate between 1° C./min and 20° C./min, preferably 10° C./min; remaining at the temperature between 750° C. and 900° C., preferably 850° C., for 30 minutes and 120 minutes, preferably 60 minutes; cooling at the rate between 1° C./min and 10° C./min, preferably 5° C./min, until room temperature is reached.

The electrochemical trimming of the thread may be made as illustrated in FIG. 6. In this method, one applies a potential difference between the cathode (14) a rim of diameter (15) between 3 and 30 mm, preferably 10 mm, made with a platinum or gold thread, preferably platinum, and the anode (13) the gold thread to be trimmed). The reaction takes place under electrolytic solution (16), normally an acidic solution, preferably a concentrated HCl (37%) solution, which may be present only in the rim, as a membrane, or involving the whole setup. The potential difference between the cathode and the anode should be of 1 V to 10 V, preferably 4V, and maybe AC or DC or AC+DC, preferably AC with frequency of 500 Hz. The trimming on the Au thread will take place more intensely at the height of the cathode rim, leading to a cut in the thread in this position. Finally, this process leads to the manufacture of a tip at the lower end of the upper thread, with the properties suitable for the desirable application. A critical factor in the electrochemical trimming method is the cut of the current when the thread breaks. In this way, it is advisable to use an automated system for monitoring the current that may turn off the voltage when detecting an abrupt variation in the current.

The making of the trimming close to the apex may be made on a dual-beam microscope, with a focused-ion beam (FIB) and another beam of electrons (scanning electron microscope SEM). With this system, it is possible to make the cut with precision, without making many images by FIB, which may damage the probe. For this same reason, it is recommended to use low currents in the FIB (<100 pA, preferably 7 pA). The positioning of the tip at the height of coincidence between the focus of the two beams is carried out preferably by using only SEM images.

The plane (11) of the trimming (3) may form an angle (9) with respect to the central axis (10) that ranges from 45 degrees to 135 degrees, preferably perpendicular.

The dimensions of the trimming should be as follows:
- (8) depth: 1 nm to 300 nm, preferably 40 nm;
- (7) width: 1 nm to 300 nm, preferably 10 nm;
- (5) distance between the trimming and the apex of the probe: 50 nm to 1 µm, preferably the value supplied by the graph of FIG. 5 (when using Au), which will depend on the application (incident light used in the system). For example, the distance will preferably be of 260 nm, if the Au probe is used in a system that uses red light ($\lambda \approx 650$ nm) as incident radiation.

The trimming does not need to be made on the two sides, being sufficient on one side alone.

The junction of the device to the tuning fork (12) may be made with the aid by transfer with micrometric precision. The tip, already with the trimming, should be positioned on one stage. The device should then be fixed to the tuning fork, moving only the latter, with epoxy glue or cyanoacrylate ester, or any instantaneous adhesive, preferably epoxy glue. The result will be the device, already glued to the tuning fork, as shown in FIG. 3.

Numberless features and advantages were described along the specification, including a number of alternatives, together with details of the structure and function of the devices and/or methods. The embodiments and examples highlighted are illustrative and not limitative of the scope of the present invention.

Thus, it will be evident to those skilled in the art that various modifications may be made, including combinations within the principles of the present description, in all the extent indicated by the broad, general meaning of the terms in which the accompanying claims are expressed. These various modifications are embraced inasmuch as they do not depart from the spirit and scope of the accompanying claims.

The invention claimed is:

1. A metallic device for near-field optical microscopy and spectroscopy, said device comprising a single body with longitudinal prolongation, a nanometric apex in the form of a closed tip, and a central axis; said longitudinal prolongation having a decreasing cross-section toward the apex, and at least one trimming on a surface of said longitudinal prolongation being made according to the orientation axis that forms an angle with central axis, wherein said trimming is located at a distance of 50 nm to 2 µm from said trimming to said apex.

2. The metallic device according to claim 1, wherein the body is composed of a metal selected from the group consisting of gold, silver, copper, aluminum, platinum, and a combination thereof.

3. The metallic device according to claim 1, wherein the tip has a shape of a pyramid or cone.

4. The metallic device according to claim 1, wherein a length of said trimming ranges from 20% to 100% of a circumference of the perimeter of the tip where the trimming is made, said trimming being made in an intermittent or continuous manner, and wherein said trimming is made on the surface of said longitudinal prolongation according to the orientation axis that forms an angle of between 45 degrees and 135 degrees with said central axis of said longitudinal prolongation.

5. The metallic device according to claim 1, wherein the depth of said trimming ranges from 1 nm to 300 nm.

6. The metallic device according to claim 1, wherein the depth of said trimming ranges from 10 nm to 100 nm.

7. The metallic device according to claim 1, wherein the depth of said trimming ranges from 1 nm to 500 nm.

8. The metallic device according to claim 1, wherein the depth of said trimming ranges from 1 nm to 100 nm.

9. The metallic device according to claim 1, wherein the depth of said trimming ranges from 1 nm to 20 nm.

10. The metallic device according to claim 1, coupled to a system for sensing probe-surface interaction, and further wherein said device is configured to move along the planes of xz, xy, and yz with respect to a surface being probed.

11. The metallic device according to claim 3, the distance from said trimming to said apex is from 100 nm to 700 nm.

12. The metallic device according to claim 11, wherein said system for sensing probe-surface interaction is a tuning fork.

13. The metallic device according to claim 1, which is configured for use in near-field optical microscopy or spectroscopy.

14. The metallic device according to claim 13, which is configured for use in Scanning Near-field Optical Microscopy (SNOM) or Tip-Enhanced Raman Spectroscopy (TERS).

15. A method of manufacturing a metallic device as defined in claim 1, said method comprising trimming a surface of said longitudinal prolongation with a focused ion-beam, said trimming being made according to said orientation axis that forms an angle of between 45 degrees and 135 degrees with said central axis.

16. The method according to claim 15, wherein said angle is 90 degrees.

* * * * *